Dec. 24, 1968 M. SCHWARTZ ET AL 3,418,119
METHOD OF CUMULATIVELY RECORDING INTELLIGENCE ON A RECORD CORD
Original Filed June 17, 1954 4 Sheets-Sheet 1

INVENTORS.
MORRIS SCHWARTZ
EDWARD K. KAPRELIAN
BY
ATTORNEY

INVENTORS
MORRIS SCHWARTZ
EDWARD K. KAPRELIAN
BY
ATTORNEY

INVENTORS.
MORRIS SCHWARTZ
EDWARD K. KAPRELIAN
BY
[signature]
ATTORNEY

METHOD OF CUMULATIVELY RECORDING INTELLIGENCE ON A RECORD CORD

Original Filed June 17, 1954 4 Sheets-Sheet 4

INVENTORS.
MORRIS SCHWARTZ
EDWARD K. KAPRELIAN
BY
ATTORNEY

United States Patent Office 3,418,119
Patented Dec. 24, 1968

3,418,119

METHOD OF CUMULATIVELY RECORDING INTELLIGENCE ON A RECORD CARD

Morris Schwartz, Hultenius St., Plainville, Conn. 06062, and Edward K. Kaprelian, Rte. 3, Box 14, Joppa, Md. 21085

Continuation of abandoned application Ser. No. 283,670, May 24, 1963, which is a continuation of application Ser. No. 437,540, June 17, 1954. This application July 12, 1965, Ser. No. 471,172
9 Claims. (Cl. 96—27)

ABSTRACT OF THE DISCLOSURE

There is disclosed a method of cumulatively recording independent intelligence entries spaced in time in the form of photographic images by producing on a carrier such as a card providing space for a plurality of photographic images each representing one entry, a photographic image occupying a selected one of several predetermined fractional areas on the card while shielding the remaining fractional areas, and producing after an arbitrary period of time a second photographic image representing a second entry on another selected fractional area of the card and so forth, thereby accumulating on the same card a sequence of entires representing a continuing transaction in numerical and chronological order.

The present invention relates to a method of photographically recording intelligence and to means for carrying out the method.

The present application is a continuing application based upon our co-pending application Ser. No. 283,670, filed May 24, 1963, now abandoned which, in turn, is a continuation of application Ser. No. 437,540, filed June 17, 1954, now abandoned.

It has been found increasingly desirable photographically to reproduce intelligence in a more compact and smaller form than the form in which the intelligence is originally available, partly to save storage space and partly for reasons of safety.

The term "intelligence" as used herein, is intended to be understood in its broadest sense, that is, to include information in printed, typed, written or otherwise visibly recorded form, drawings, graphs, photographs, etc.

There are known and widely used for the purpose of reproduction on a reduced scale:

(1) Microfilm in form of a continuous strip.
(2) Individual loose pieces of microfilm kept in jackets or jacket cards.
(3) Microcards.

Continuous microfilm strips are primarily intended for dead files, and once an item is photographed on the strip it is intended to remain unaltered in a dead file until needed for reference. The length of the film makes it difficult to locate a specific item and it is even more difficult to detach the part of the strip referring to a specific item or to make photographic copies of such part.

Jackets and jacket cards are more flexible as to specific intelligence but the handling of small pieces of film is inconvenient and time consuming. Moreover, individual pieces of film are easily lost and the jackets and jacket cards occupy a comparatively large storage space.

Microcards are in effect the equivalent of a library or reference book in compact form. The card is useful but only as a complete record or copy of a finished document or other intelligence.

All three aforementioned recording means have in common the inherent limitation that once an intelligence is recorded no further intelligence can be added, or in other words, the extent of the intelligence that can be recorded is frozen by the first use of the recording means.

This limitation presents a serious disadvantage in many fields of application.

For instance, in a business firm it is desirable to reproduce in compact form and on a small scale all correspondence and data pertaining to a certain transaction such as original correspondence, billing, shipping data, payment, etc. Similarly, compact and small scale reproduction of insurance, scientific, technical, medical data, etc. is desirable. Intelligence of tthe aforeindicated nature is usually gradually developed and during a considerable period of time. As a result, recording means as heretofore known can only be used after the entire transaction is completed since they do not permit a step-by-step recording. It would, of course, be possible to reproduce each intelligence data as it is developed on a separate film or card but such a disjointed reproduction of many films or cards would jeopardize the certainty of the preservation of the entire record.

Accordingly, a principal object of the present invention is to provide a novel method of cumulatively recording intelligence which permits to record on a reduced scale a plurality of intelligence items on one and the same carrier such as a card, at different times and to provide novel means to carry out the aforesaid method.

The recording system according to the invention affords the advantage that intelligence entries can be conveniently recorded as they are developed. For instance, a single card may be used chronologically to enter the name and address of a party, correspondence, billing and all other entries pertaining to one or several transactions transacted with the respective party. The result is a life record to which may be added entries either on a day-to-day or other convenient periodic basis. The up-to-date record thus kept can be viewed quickly and conveniently whenever desired in a projector or viewer. Suitable projectors and viewers which show the intelligence entries recorded on the card under magnification, preferably in approximately original size, have been developed in connection with conventional microfilm and microcards and are readily available in the market.

Another object of the invention is to provide a novel and improved carrier the total image carrying area of which is usable in the form of serveral sub-areas. Each of the sub-areas serves to receive a separate entry independently of and without interference with other sub-areas, used or unused.

Still another object of the invention is to provide a novel and improved intelligence carrier the total image receiving area of which is divided in a plurality of sub-areas each serving to receive a separate entry and independently usable. This affords the advantage that the sub-areas can be progressively used as new intelligence data are developed and until the total image receiving area of the carrier is filled. The images representing the individual intelligence entries may be either directly produced on the receiving area by sensitizing the same or be transferred thereto.

Yet another object of the invention is to provide markers or indicia on the image carrier which permit conveniently to ascertain the used and the free sub-areas.

Another important object of the invention, allied with the preceding ones, is to provide a novel holder for the aforesaid intelligence carrier which permits conveniently to present the carrier to image producing or transferring means for making an entry on one of the free sub-areas of the carrier.

A further object of the invention is to provide locating means on the holder and the image carrier for conveniently and accurately placing and retaining the carrier in a position in the holder in which a free sub-area next adjacent to a used sub-area is presented to the image producing or transferring means.

Another important object of the invention, allied with the preceding ones, is to provide novel and improved means for producing a reduced image of the intelligence to be recorded directly on a selected free sub-area of the carrier.

Still another important object of the invention, also allied with the preceding ones, is to provide novel and improved means for transferring a reduced image of an intelligence entry to be recorded by a selected free sub-area of the carrier. The image proper may be produced by any transfer method, conventional or non-conventional, suitable for the purpose.

Other and further objects, features and advantages of the invention will be pointed out hereinafter and set forth in the appended claims forming part of the application.

In the accompanying drawing several preferred embodiments of the invention are shown by way of illustration and not by way of limitation.

Figure 1:
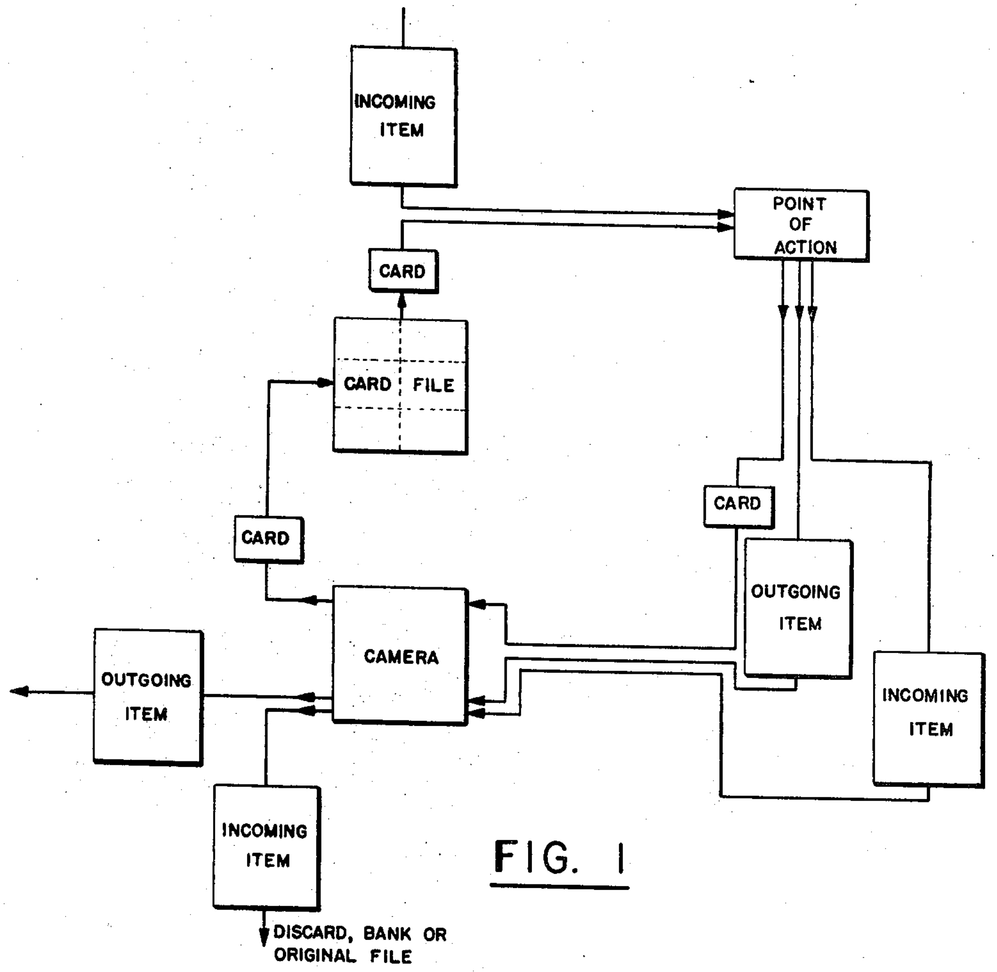
FIG. 1 is a flow chart showing the steps involved in the method according to the invention.

Referring first to the flow chart of FIG. 1 in detail, this chart shows the several steps which comprise the method of cumulative recording according to the invention, exemplified in connection with a business transaction.

(1) An incoming item of intelligence is received. Such item may be in the form of a letter, check, invoice, statement, etc.

(2) Based upon the title or classification of the item a suitable card is either freshly prepared if the item be a new one or the correct card is extracted from the card file. The location of the cards may be based upon an alphabetical filing or in accordance with any of the numerous machine sorting equipments available for the purpose.

(3) The incoming item together with the card, is delivered for suitable action to the point of action which may be the location of the appropriate department or the individual in charge.

(4) After suitable action such as a reply to a letter, a receipt made out for a check, or a check prepared for payment for an invoice, etc., all three items, that is, the card, the incoming item and the outgoing item are delivered to the image producing means such as a camera which photographically records both the incoming item and the outgoing item on the card.

(5) The card is returned to the card file.

(6) The incoming item is discarded, for instance, if it comprises an ordinary reply or receipt, or is otherwise suitably handled if it is a check or other important document.

(7) The outgoing item is mailed or otherwise suitably disposed of. A carbon copy of the item is generally not necessary by reason of the photographic record.

The image producing means which will be subsequently described more in detail, copy the incoming item and the outgoing item on a reduced scale, a reduction of one to fifteen or one to thirty being generally used.

The image may be copied directly upon the surface of the card or upon an intermediate surface from which the image is transferred to the card surface. The cards may be transparencies or of the image reflecting type. As previously mentioned, the images on the card are viewed under magnification so that the image appears in approximately the original size.

Figure 2:
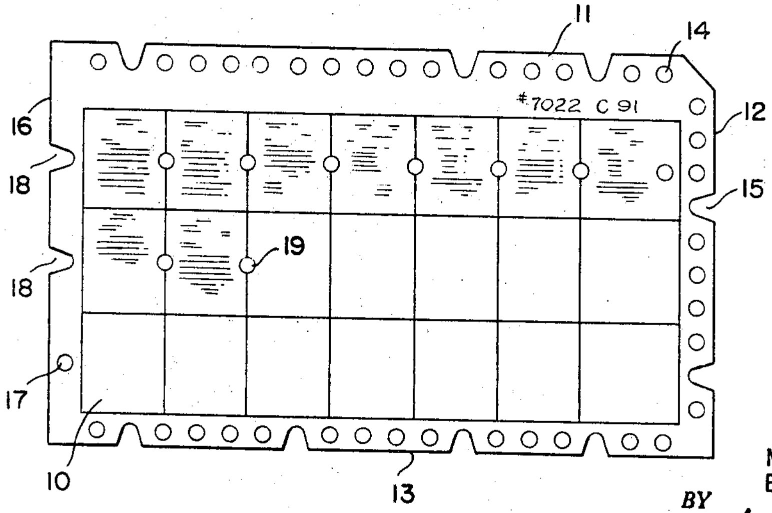
FIG. 2 is a plan view of a card according to the invention.

FIG. 2 shows a card employing reflection type images. It may have any convenient size, a size of three inches by five inches being generally advantageous from the viewpoint of handling convenience. Any material suitable for the purpose may be used. White Bristol board or similar material coated with baryta or other substance suitable for the specific process employed has been found useful for cards employing reflection type images. If the card is used in transmission projection, it may be made of cellulose acetate or similar transparent stable material.

The image receiving area of the card is shown as being divided to form 21 frames 7 arranged in three parallel rows. The frames need not be marked by the frame lines shown in FIG. 2 but it is advisable to provide frame lines as they facilitate the locating of the card and the handling of the same for viewing. Sides 11, 12 and 13 of the card are shown as being provided with suitable indexing holes 14 and notches 15 as are conventionally used for rapid and convenient sorting of file cards by machines. The fourth side 16 is used to provide markings for identifying the active and the free rows of the frames. These markings may take any suitable shape. There are shown a circular hole 17 to indicate a free row and notches 18 to indicate an active row. When a card is fresh, markings 17 appear alongside of all three rows and when all three rows are completed or at least started, notches 18 are substituted for all the markings 17. In addition, markings are provided for indicating each occupied frame within a row. These markings are shown in FIG. 2 as punch holes 19 placed in the dividing line between the last used frame and the next adjacent free frame.

Both the notches 18 and holes 19 serve to facilitate locating of the card during the image producing operation as will be more fully explained hereinafter.

The card is preferably provided with an area on which suitable typewritten or hand written entries for identification purposes may be made. In the card of FIG. 2, this area is provided by broadening the marginal space between edge 11 and the top row of frames.

To record successive items in chronological or other proper order, the frames should be used in a definite sequence. For instance, the top row may first be used from left to right, then the next row from left to right, etc. Hence, the third frame in the second row should be used next on the card of FIG. 2. Of course, any other sequence of the frames may also be employed.

Figure 3:
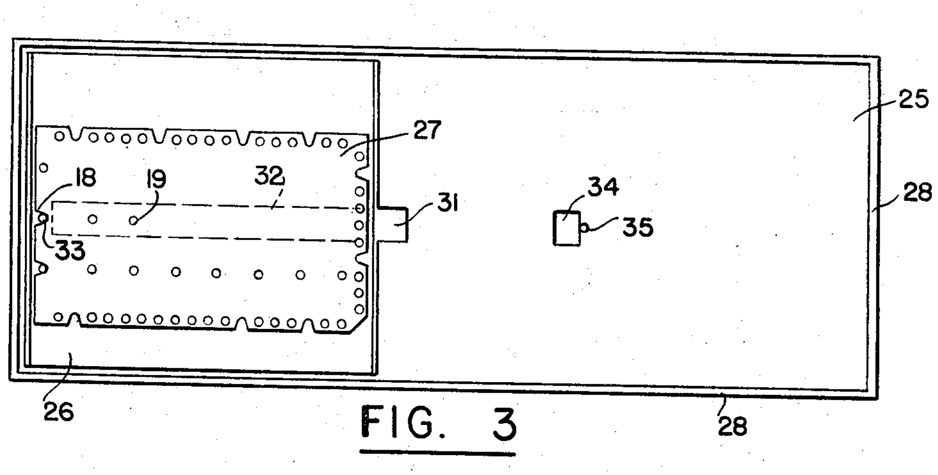
FIG. 3 is a plan view of a device according to the invention for indexing a card such as shown in FIG. 2.
Figure 4:
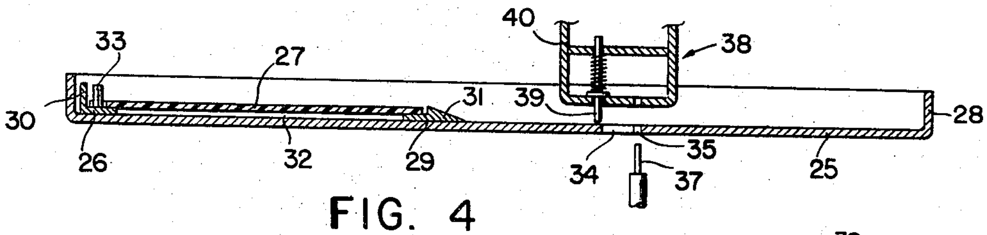
FIG. 4 is a longitudinal section of FIG. 3 and of a locating device associated with the indexing device.
Figure 5:
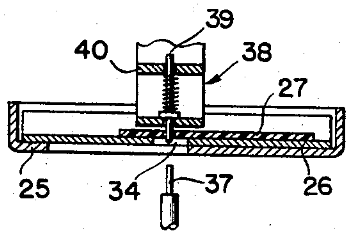
FIG. 5 is a transverse section of FIG. 3.

To facilitate alignment of the next free frame with the camera gate or the means for transferring the image to a respective frame, the guiding or indexing device of FIGS. 3 to 5 may be advantageously employed. This guiding device permits a semi-automatic locating of a card.

The device comprises a rectangular tray 25 which slidably supports a card holder generally designated by 26 for a card 27 of the kind shown in FIG. 2. The length and width of the tray are such that the holder may be slid on the tray in the direction parallel with the rows of frames on the card but is prevented from movement transversely to the rows. The raised rim 28 of the tray guides the holder and limits its displacement on the tray. The holder in turn is so dimensioned that it prevents displacement of the card in the direction of the rows but permits a displacement transversely thereto. For this purpose, the right hand side of the holder as seen in FIG. 4 is shouldered at 29 and the opposite edge is provided with a rim 30. The base of the holder is formed with a slot 32 corresponding in length and width to one of the frame rows of the card as shown in FIG. 2. The extent of the possible transverse displacement of the card on the holder must be such as to permit placement of each of the frame rows in registry with slot 32. The holder further comprises a locating pin 33 disposed in alignment with the left hand short side of slot 32.

Slot 32 coacts with a window 34 through the base of the tray. This window corresponds in length and width to a single one of the frames on card 27 and is disposed in alignment with slot 32. A circular hole 35 shown adjacent to the right edge of window 34 permits passage of a punch 37 which serves to punch the holes 19 through the card after copying of an image upon the respective frame.

The tray is further equipped with a locating device, generally designated by 38. This device is shown as a mechanical locator comprising a spring loaded probe pin 39 guided in an appropriate housing 40. To facilitate sliding of holder 26 under probe pin 39, a slanted tongue 31 may be provided. The locator, more specifically the probe pin thereof, is disposed adjacent to the left side of window 34 in alignment with tray hole 35 as can best be seen in FIG. 4. Instead of using a mechanical locating device, it is, of course, also possible to employ an electric locating device in which event holes 19 permit contact by a contact pin similar to pin 39 and connected to an appropriate sensing circuit. Electrically operated locating devices of this type are well known in the art and a detailed description thereof is not essential for the understanding of the invention.

The means for producing an image on a frame, either by direct copying or by the transfer method, should be visualized as being aligned with window 34 and will be more fully described hereinafter.

As previously mentioned, the indexing device according to FIGS. 3, 4 and 5 serves to facilitate location of the appropriate frame in registry with window 34. For the card according to FIG. 2 this would be the third frame from the left in the second row. The indexing device functions as follows:

The card of FIG. 2 is placed in the card holder, face down, with the notch 18 associated with the second row of frames in engagement with locating pin 33. The second row of frames is thus in alignment with slot 32. The holder is now slid on the tray towards the right until probe pin 39 engages the first hole 19 it encounters. As a result, the first unused frame in the second row, that is, the third frame in this row, is in registry with window 34. The image is now produced on this frame and a hole 19 is punched by punch 37 through the right edge of the frame as seen in FIG. 2.

As is apparent from the previous description, the coaction of locating pin 33 and locating device 38 permits a convenient location of the card in both directions.

Figure 6:
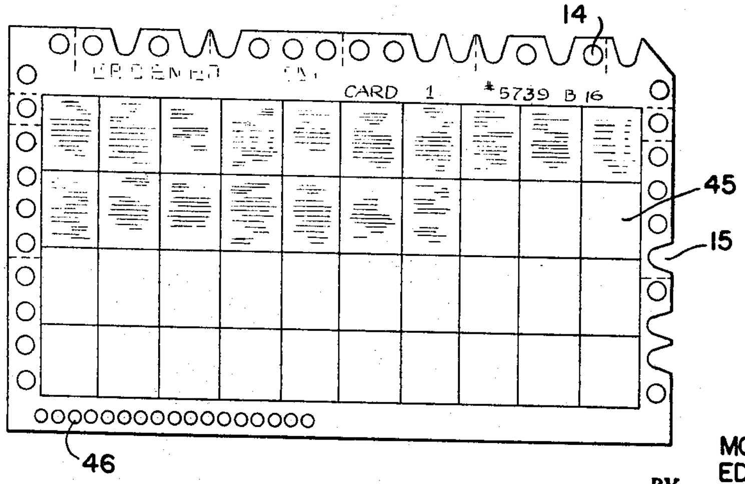
FIG. 6 is a plan view of a modification of the card of FIG. 2.

FIG. 6 shows a card similar in principle to the card according to FIG. 2. The card of FIG. 6 has forty frame areas 40. However, any other desirable number of frame areas may be provided as may also be in the card of FIG. 2. In contrast to the card of FIG. 2, the perforations indicating used frames are located at the bottom edge of the card. In the example shown, seventeen of the forty frame areas on the card already contain data and hence seventeen holes 46 are shown.

An appropriate indexing device for aligning the eighteenth frame of this card, that is, the eight frame in the second row, with the window of the device may be easily visualized from the description of the indexing device according to FIGS. 3 to 5. An indexing device suitable for the card of FIG. 6 may be equipped with a well known counting mechanism which counts the perforations 46 when the card is fed, face down, into the indexing device and properly locates the card so that the eighteenth frame is aligned over the window. When the image has been applied to the eighteenth frame, an eighteenth hole 46 is punched.

Figure 7:
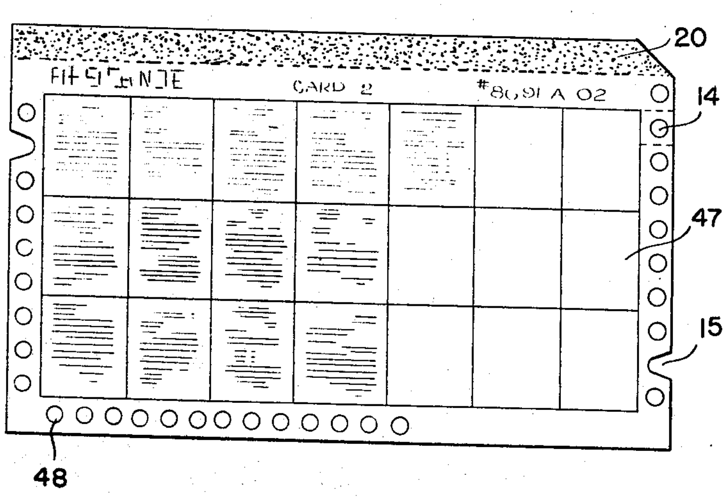
FIG. 7 is a plan view of another modification of the card of FIG. 2.

Still another type of card is shown in FIG. 7. The card according to this figure is shown as having twenty-one frames 47, but any other number of frames may also be provided. In contrast to the previously described cards, the images are recorded on the card of FIG. 7 one column at a time, starting at the top left and progressing downwardly along the first column, beginning again at the top of the second column, etc. The frame identifying perforations are so arranged that when a column has been filled, holes 48 corresponding to that column occupy the marginal area directly beneath the column. As can be seen, the first four completed columns are represented by three perforations each and the just started fifth column by a single hole. The use of columns and placement of the identifying perforations along the bottom edge of the card facilitate the location thereof, since only one marking has to be detected instead into the two markings 18 and 19 of the card of FIG. 2.

The upper portion of the card is provided with a strip 20 of magnetic recording material. Part of the card information is recorded on this strip in a manner already well known, and the card can be sorted or classified by virtue of the magnetic pattern recorded on the stripe. Obviously, a magnetic strip could also be utilized in place of holes 48 for the purpose of frame sequence control.

Various other arrangements of the frames and the identifying markings associated therewith may be easily visualized without departing from the basic concept of the invention, namely to cumulate a plurality of intelligence data on a single intelligence carrier by using for such entry a fractional area of the carrier only, in other words, to provide on the carrier a plurality of image receiving areas or frames which are independently usable.

As has been previously mentioned, the various camera arrangements suitable for use in connection with the cards according to the invention may be classified as being either of the direct or indirect kind. By direct arrangements are meant arrangements in which the image of the original is formed directly on the card surface while the indirect arrangements are those in which the image is formed on an intermediary surface with subsequent transfer to the card surface proper.

One suitable system of the indirect kind employs the so-called diffusion transfer process well known in the art. In this system, the surface of the card is not light sensitive, but it has been suitably prepared in a manner well known in the art.

Figure 8:
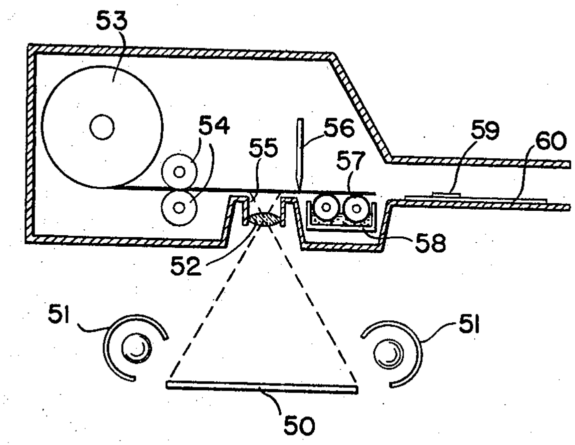
FIG. 8 is a diagrammatic view, partly in section, of means transferring images of intelligence to a card according to the invention by a diffusion transfer process.

FIG. 8 shows diagrammatically a diffusion transfer arrangement suitable for the purpose. The original 50 illuminated by lights 51 is photographed through the lens system 52 of a reduction camera directly on a silver halide surface such as may be provided by a high contrast, high resolution negative emulsion coated on a paper roll. The paper is fed from a supply roll 53 of light sensitive paper through feed rolls 54 past the camera gate 55. After photographing, the end of the strip carrying the image is cut with a knife 56 and coated with a developing reagent, for instance, by means of rollers 57 dipping into a vessel 58 containing a bath of the reagent. The transfer piece 59 thus obtained is applied to the appropriate frame of a card 60 by any means suitable for the purpose. The image develops and is transferred to the card surface in a manner already well known. Finally, the perforation identifying the used frame is punched in the card as has been previously described and the developed piece of negative paper is peeled off and discarded.

Figure 9:
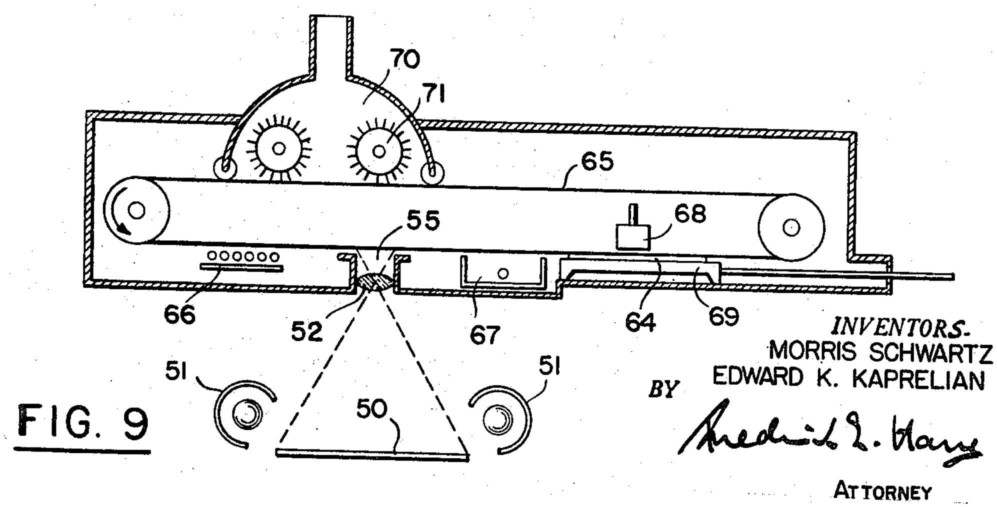
FIG. 9 is a diagrammatic view, partly in section, of a device for transferring images to a card by an electrophotographic process.

FIG. 9 shows diagrammatically an arrangement employing electrophotography.

The arrangement according to FIG. 9 comprises an endless belt 65 of electrophotographic material which is moved successively past a charging grid 66, the camera gate 55 and a developing chamber 67 to a transfer point. At the transfer point, the image is transferred, for instance, by means of a plunger 68 to the appropriate frame of a card 64 resting upon a card holder 69. The belt continues to move through a cleaning chamber 70 in which it is put in condition for re-use, for instance, by means of brushes 71.

The electrophotographic system permits to use a card having a smooth dense calendered surface depending upon the character of the image particles.

Fixing of the image may be accomplished by any means suitable and known for the purpose, for instance, by brief heating with an infra-red lamp, spraying or brushing with a suitable transparent lacquer, or covering with a suitable transparent plastic layer which adheres to the card surface.

Figure 10:
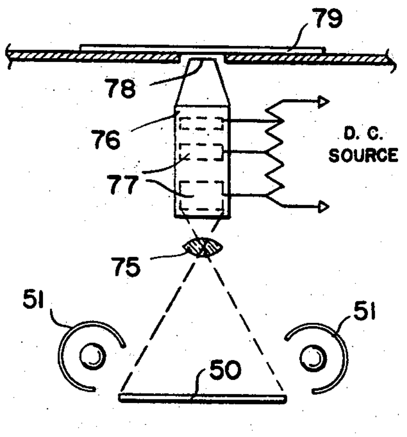
FIG. 10 is a diagrammatic view of a device for producing an image directly on the card by means of an image tube.

FIG. 10 shows a direct imaging arrangement.

According to FIG. 10, the original 50 is first imaged by a lens 75 upon the face of an image tube 76 which is provided witth an electron emitting layer at the inner side of the face. The electrons are emitted by this face in a pattern corresponding to the light image formed by the lens. The imaged electrons are accelerated in a well known manner by sets of acceleration electrodes 77 connected to a D-C source. They emanate from the image tube through an electron transparent window 78 at the rear end of the tube. Windows of this type may consist for instance, of beryllium foil. The card 79 is prepared with an electron sensitive surface so that the electrons striking this surface reproduce thereon the original in reduced size. Various electron sensitive but non-light sensitive coating materials are well known in the art. Direct imaging arrangements according to FIG. 10 are more fully described in United States Letters Patent 2,409,454.

Figure 11:
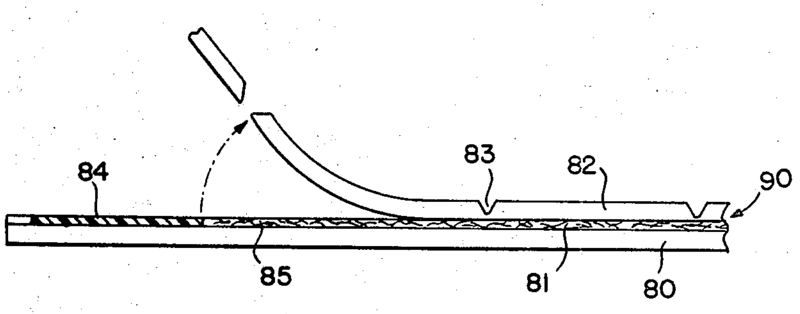
FIG. 11 is a section of a card suitable for producing an image directly thereon.

The practice of the present invention also encompasses use of a card coated with a suitably protected light sensitive layer. FIG. 11 shows a card of this type. According to this figure, a card base 80 is coated with a light sensitive layer 81, such as a layer of light sensitive diazonium which is protected by an adhesive layer 82. This layer may comprise a metal foil backed with an adhesive or may consist of an organic yellow filter layer backed with a suitable adhesive. The layer is preferably notched at 83 or otherwise weakened at intervals corresponding to the desired frame areas to facilitate removal of an appropriate strip of the protective layer. There is indicated at 84 an exposed and developed frame and at 85 a fresh area of the light sensitive layer which is readied for exposure.

Figure 12:
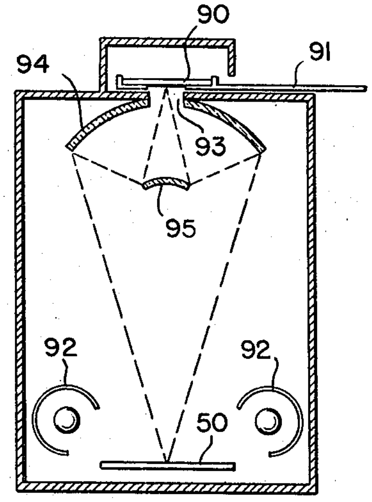
FIG. 12 is a diagrammatic view, partly in section, of a device for producing an image directly on the card.

The images of the original 50 may be produced on a card such as shown in FIG. 11 by the camera arrangement of FIG. 12.

According to this figure, the respective uncovered light sensitive area of a card 90 supported on a holder 91 is exposed through use of ultra-violet lights 92 and a suitable optical system of large aperture properly corrected for the ultra-violet end of the spectrum and having a high efficiency in this region, a mirror system being preferred. The light rays are reflected by a spherical mirror 94 upon a second mirror 95 which, in turn, reflects the image through a central hole 93 in mirror 94 upon the card.

The latent image thus produced is then suitably developed in an ammonia atmosphere. The protective adhesive layer 82 of the card prevents an action of the ammonia developer upon the non-exposed portion of the card and also unwanted exposure to light.

Instead of the aforedescribed sensitive layer and exposure by ultra-violet light, an ordinary printout silver emulsion may be employed with a similar protective layer.

Such similar emulsion can be exposed in normal fashion.

Processing of such a printout card may take any of the forms usual for the purpose, but stabilization with thiourea is preferred because of its speed and simplicity.

It is further practical and in some instance preferable to coat the card itself with an electrophotographic layer of selenium, anthracene, sulfur, etc. and to form the image directly upon the card rather than by transfer as shown in FIG. 9. In use, the area of the card to be exposed or the entire card is charged with a potential between 200 and 400 volts. The exposure is made in an electrophotographic camera and the image is developed in a spray chamber or similar arrangement. The image which is preferably of a contrasting color, is fixed to the electrophotographic surface of the card by heating or spraying with a suitable transparent lacquer.

Finally, it is possible to employ a silver halide material in the form of a striping layer. This arrangement permits to subject the image to rapid processing, requiring one minute or even less. The exposed transfer piece is stripped from the base upon which it is produced and transferred to the face of the card where it is permanently fastened with a suitable adhesive.

Although in the previous description reference has been generally made to opaque cards, it will be evident that the method according to the invention and the various camera arrangements and other means hereinbefore described can be equally well applied to a transparent card.

While the invention has been described in detail with respect to certain now preferred examples and embodiments of the invention, it will be understood by those skilled in the art after understanding the invention, that various changes and modifications may be made without departing from the spirit and scope of the invention, and it is intended, therefore, to cover all such changes and modifications in the appended claims.

What is claimed is:

1. A method for cumulatively recording independent intelligence entries spaced in time in the form of photographic images, comprising the steps of providing a card having on its surface a photosensitive layer capable of having formed thereon a plurality of permanent visible photographic images, exposing to image-producing radiation only a selected one of several predetermined fractional areas of said layer to produce a latent photographic image on the selected area, and processing said latent image to visible permanent form while shielding the remaining fractional areas from having formed thereon photographic images.

2. A method for cumulatively recording independent intelligence entries spaced in time in the form of photographic images, comprising the steps of providing a card having on its surface a layer on which a plurality of permanent visible photographic images are developable, forming from image-producing radiation a latent photographic image of an entry and forming on a selected one of several predetermined fractional areas of said layer a permanent visible photographic image corresponding to said latent photographic image while shielding the remaining fractional areas from having formed thereon photographic images.

3. A method for cumulatively recording independent intelligence entries spaced in time in the form of photographic images, comprising the steps of providing a card having on its surface a layer on which a plurality of permanent visible photographic images are developable, and forming on a selected one of several predetermined fractional areas of said layer a permanent visible photographic image corresponding in pattern to that of a source of image-producing radiation while shielding the remaining fractional areas from having formed thereon photographic images.

4. A method as claimed in claim 3, in which the images on each of said several predetermined fractional areas are separately and independently developable.

5. A method as claimed in claim 1, including the step of forming markings on the card indicative of the specific fractional areas on which photographic images have been developed.

6. A method for cumulatively recording independent intelligence entries spaced in time in the form of photographic images, comprising the steps of providing a card having on its surface a photosensitive layer capable of having formed thereon a plurality of permanent visible photographic images and having a protective layer opaque to radiant energy removably overlying said photosensitive layer, removing the protective layer from a selected one of several predetermined fractional areas of said photosensitive layer, exposing said selected area to image-producing radiation to produce thereon a latent photographic image, and processing said latent image to visible permanent form while maintaining the integrity of the protective layer overlying the remaining fractional areas.

7. A method for cumulatively recording independent intelligence entries spaced in time in the form of photographic images, comprising the steps of providing a card having on its surface a photosensitive layer capable of having developed thereon a plurality of permanent visible photographic images and having a protective layer opaque to radiant energy and impervious to the action of the developer for forming photographic images removably overlying said photosensitive layer, removing the potective layer from a selected one of several predetermined fractional areas of said photosensitive layer, exposing said selected area to image-producing radiation to produce thereon a latent photographic image, and processing said latent image to visible permanent form while maintaining the integrity of the protective layer overlying the remaining fractional areas.

8. A method for cumulatively recording independent intelligence entries spaced in time in the form of photographic images, comprising the steps of providing a card having on its surface a light-insensitive layer capable of having formed thereon a plurality of permanent visible photographic images, exposing to image-producing radiation a light-sensitive layer carried by a base support to produce thereon a latent photographic image, and developing said light-sensitive layer in contact with a selected one of several predetermined fractional areas of said light-insensitive layer to form on the latter by diffusion transfer a visible permanent image corresponding to that in the image-producing radiation while shielding the remaining fractional areas from having formed thereon photographic images.

9. A method for cumulatively recording independent intelligence entries spaced in time in the form of photographic images, comprising the steps of providing a card having on its surface an electron-sensitive layer capable of having formed thereon a plurality of permanent visible images, converting a light image of an entry into a corresponding electron image, exposing to the electron image only a selected one of several predetermined fractional areas of said layer to produce a latent photographic image on the selected area, and processing said latent image to visible permanent form while shielding the remaining fractional areas from having formed thereon photographic images.

References Cited

UNITED STATES PATENTS

| | | | |
|---|---|---|---|
| 875,770 | 1/1908 | Borzykowski | 96—79 |
| 1,000,323 | 8/1911 | Butler | 96—41 |
| 1,240,344 | 9/1917 | Ives | 96—67 |
| 1,396,770 | 11/1921 | Mees | 95—13 X |
| 1,416,706 | 5/1922 | Grass | 96—43 |
| 1,511,042 | 10/1924 | Satterlee | 96—43 |
| 1,618,575 | 2/1927 | Cooper | 96—79 |
| 1,755,129 | 4/1930 | Pomeroy | 96—42 |
| 1,958,727 | 5/1934 | Sullivan | 96—27 |
| 2,206,206 | 7/1940 | Smith | 96—79 |
| 2,512,106 | 6/1950 | Langan | 96—27 |
| 2,682,463 | 6/1954 | Olsen | 96—30 |
| 3,275,439 | 9/1966 | Battison et al. | 96—41 |

OTHER REFERENCES

Dessauer et al. Xerography Today In. Photographic Engineering (1955) 6(4); page 264.

NORMAN G. TORCHIN, *Primary Examiner.*

R. E. FICHTER, *Assistant Examiner.*

U.S. Cl. X.R.

40—158; 96—75, 1, 41, 43, 78; 235—61.12

UNITED STATES PATENT OFFICE
CERTIFICATE OF CORRECTION

Patent No. 3,418,119 December 24, 1968

Morris Schwartz et al.

It is certified that error appears in the above identified patent and that said Letters Patent are hereby corrected as shown below:

In the heading to the printed specification, lines 4 to 6, "Hultenius St., Plainville, Conn. 06062, and Edward K. Kaprelian, Rte. 3, Box 14, Joppa, Md. 21085" should read -- Plainville, Conn., and Edward K. Kaprelian, Joppa, Md., assigno to The Kalart Company Inc., Plainville, Conn.

Signed and sealed this 23rd day of June 1970.

(SEAL)
Attest:

EDWARD M.FLETCHER,JR.
Attesting Officer

WILLIAM E. SCHUYLER,
Commissioner of Paten